(12) United States Patent
Kunze et al.

(10) Patent No.: US 12,264,934 B2
(45) Date of Patent: Apr. 1, 2025

(54) METHOD FOR IMPROVED DEPICTION OF AT LEAST ONE VIRTUAL ELEMENT IN A VIEW-LIMITED DISPLAY DEVICE

(71) Applicant: Volkswagen Aktiengesellschaft, Wolfsburg (DE)

(72) Inventors: Alexander Kunze, Berlin (DE); Yannis Tebaibi, Braunschweig (DE); Johanna Sandbrink, Braunschweig (DE); Vitalij Sadovitch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 465 days.

(21) Appl. No.: 17/469,056

(22) Filed: Sep. 8, 2021

(65) Prior Publication Data

US 2022/0074753 A1     Mar. 10, 2022

(30) Foreign Application Priority Data

Sep. 9, 2020 (DE) ..................... 10 2020 211 301.7

(51) Int. Cl.
*G01C 21/36* (2006.01)
*G02B 27/01* (2006.01)

(52) U.S. Cl.
CPC ....... *G01C 21/365* (2013.01); *G01C 21/3632* (2013.01); *G02B 27/01* (2013.01)

(58) Field of Classification Search
CPC .............. G01C 21/365; G01C 21/3632; G01C 21/3697; G02B 27/01; G02B 27/0101; G02B 2027/0141; G06T 11/60; G06T 19/006; G06T 7/73; G06T 2207/30252; B60K 2370/1529; B60K 2370/166; B60K 2370/177; B60K 2370/334; B60K 2370/52; B60K 2370/785; B60K 35/00
See application file for complete search history.

(56) References Cited

U.S. PATENT DOCUMENTS 9,487,139 B1 * 11/2016 Ishida ................... B60W 30/08
9,690,104 B2 *  6/2017 Kim ................... G02B 27/0093
(Continued)

FOREIGN PATENT DOCUMENTS

CN       110244460 A     9/2019     ............. G02B 27/01
CN       111094898 A     5/2020     ............. B60K 35/00
(Continued)

OTHER PUBLICATIONS

Extended European Search Report, Application No. 21194094.5, 6 pages, Feb. 1, 2022.
(Continued)

*Primary Examiner* — Kenny Nguyen
(74) *Attorney, Agent, or Firm* — Slayden Grubert Beard PLLC

(57) ABSTRACT

The invention relates to a method for depicting a virtual element in a display area of at least one display apparatus of a vehicle. Virtual elements that lie outside of the display area of a display apparatus are perceptible by the driver with a certain estimation of distance, or respectively direction, in that a driver of the vehicle is signaled when the determined three-dimensional coordinates of the at least one virtual element lie outside of the display area of the display apparatus.

8 Claims, 3 Drawing Sheets

(56) References Cited

U.S. PATENT DOCUMENTS

| | | | |
|---|---|---|---|
| 9,791,288 B2* | 10/2017 | Mueller | G01C 21/3632 |
| 11,021,103 B2 | 6/2021 | Haar et al. | |
| 11,193,785 B2* | 12/2021 | Kimura | G01C 21/3632 |
| 11,245,866 B2* | 2/2022 | Arakawa | B60R 1/26 |
| 11,790,615 B2* | 10/2023 | Kunze | B60K 35/00 |
| | | | 345/419 |
| 2005/0071082 A1* | 3/2005 | Ohmura | G01C 21/365 |
| | | | 340/995.19 |
| 2010/0253493 A1* | 10/2010 | Szczerba | G02B 27/01 |
| | | | 345/593 |
| 2016/0059697 A1* | 3/2016 | Ann | B60W 30/16 |
| | | | 701/96 |
| 2016/0332569 A1* | 11/2016 | Ishida | B60Q 9/008 |
| 2017/0053444 A1* | 2/2017 | Huang | G06F 3/04842 |
| 2018/0023970 A1* | 1/2018 | Iguchi | G08G 1/096861 |
| | | | 345/7 |
| 2018/0198955 A1* | 7/2018 | Watanabe | G08G 1/16 |
| 2019/0005726 A1* | 1/2019 | Nakano | G06T 19/006 |
| 2019/0025580 A1* | 1/2019 | Nagano | G02B 27/01 |
| 2019/0204103 A1* | 7/2019 | Kimura | G02B 27/01 |
| 2019/0278080 A1 | 9/2019 | Ishibashi et al. | |
| 2019/0299855 A1* | 10/2019 | Ostapenko | G08G 1/166 |
| 2020/0039519 A1* | 2/2020 | Kinoshita | B60W 30/0956 |
| 2020/0215917 A1 | 7/2020 | Schöning et al. | |
| 2020/0298703 A1 | 9/2020 | Max et al. | |
| 2021/0078503 A1 | 3/2021 | Horihata et al. | |
| 2021/0223058 A1* | 7/2021 | Horihata | G01C 21/3635 |
| 2021/0341737 A1* | 11/2021 | Horihata | G06V 20/20 |
| 2022/0084458 A1* | 3/2022 | Sakuma | G02B 27/01 |
| 2022/0161657 A1* | 5/2022 | Seitz | G06V 20/588 |
| 2022/0165039 A1* | 5/2022 | Kunze | G06T 19/006 |

FOREIGN PATENT DOCUMENTS

| | | | |
|---|---|---|---|
| DE | 10347213 A1 | 5/2005 | B60K 31/18 |
| DE | 102014014833 A1 | 4/2015 | G08G 1/0968 |
| DE | 102017211244 B3 | 12/2018 | B60K 35/00 |
| EP | 3352139 A1 | 7/2018 | G06K 9/00 |
| JP | 2020097399 A | 6/2020 | |
| WO | 2019/230271 A1 | 12/2019 | B60K 35/00 |
| WO | 2020/021842 A1 | 1/2020 | |
| WO | 2020/162109 A1 | 8/2020 | |

OTHER PUBLICATIONS

German Office Action, Application No. 102020211301.7, 6 pages, May 19, 2021.
CN 110244460 A, US 2019/0278080 A1.
WO 2019/230271 A1, US 2021/0078503 A1.
CN 111094898 A, US 2020/0298703 A1.
Wang, Xing et al., "Technologies of Head-Up Display for Automobiles," Electronics Optics & Control, vol. 21, No. 1, pp. 55-58, Jan. 6, 2014.
Chinese Office Action, Application No. 202111055783.X, 13 pages, Dec. 19, 2024.

* cited by examiner

METHOD FOR IMPROVED DEPICTION OF AT LEAST ONE VIRTUAL ELEMENT IN A VIEW-LIMITED DISPLAY DEVICE

CROSS-REFERENCE TO RELATED APPLICATIONS

This application claims priority to German Patent Application No. DE 10 2020 211 301.7, filed on Sep. 9, 2020 with the German Patent and Trademark Office. The contents of the aforesaid patent application are incorporated herein for all purposes.

TECHNICAL FIELD

The invention relates to a method for depicting a virtual element in a display area of at least one display apparatus of a vehicle, wherein a three-dimensional space is depicted in the display area of the display apparatus, wherein based on at least one data source, three-dimensional coordinates are determined for locating at least one virtual element, wherein the at least one virtual element is transformed as a two-dimensional image in the three-dimensional space that is depicted in the display area of the display apparatus when the three-dimensional coordinates of the virtual element in the depicted three-dimensional space lie within the display area of the display apparatus, and wherein the at least one virtual element is depicted in the display area of the display apparatus in correct perspective in the field of vision of the driver with respect to the three-dimensional space.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

With the continuous development of virtual and augmented reality technologies and applications, these are also finding their way into automobiles. Augmented reality (AR) involves the enrichment of the real world by virtual elements that are registered, or respectively located at the correct location in three-dimensional space and permit real-time interaction. One possible technical realization for correspondingly enriching the driver's workplace with virtual augmentations in correct perspective is head-up display (HUD).

Particularly with head-up displays, the virtual display arises from an imaging unit integrated in the dashboard such as a TFT display. This image is directed by several mirrors toward the windshield where the light is reflected into the eye of the driver. The driver perceives this image as a virtual display in the field of vision. When designing such systems, the area in which the light is reflected is spatially limited in order to achieve greater brightness by reduced light scatter. This area is termed the "eyebox" since the field of vision of the driver must be within this area to enable perception of the virtual image.

Given the relatively narrow field of vision, a perspective correct depiction of a virtual element may be impossible since the virtual object would have to be located outside of the "eye box". There are various approaches for displaying objects that do not lie within the field of vision of the driver.

A disadvantage of the prior art is that the driver is not given a feeling of the actual distance of relevant objects outside of the field of vision.

SUMMARY

A need exists to provide a method in which virtual elements that lie outside of the display area of a display apparatus are perceptible by the driver with a certain estimation of distance, or respectively direction.

The need is addressed by the features of the independent claim(s). Embodiments of the invention are described in the dependent claims, the following description, and the drawings.

DESCRIPTION

Figure 1:
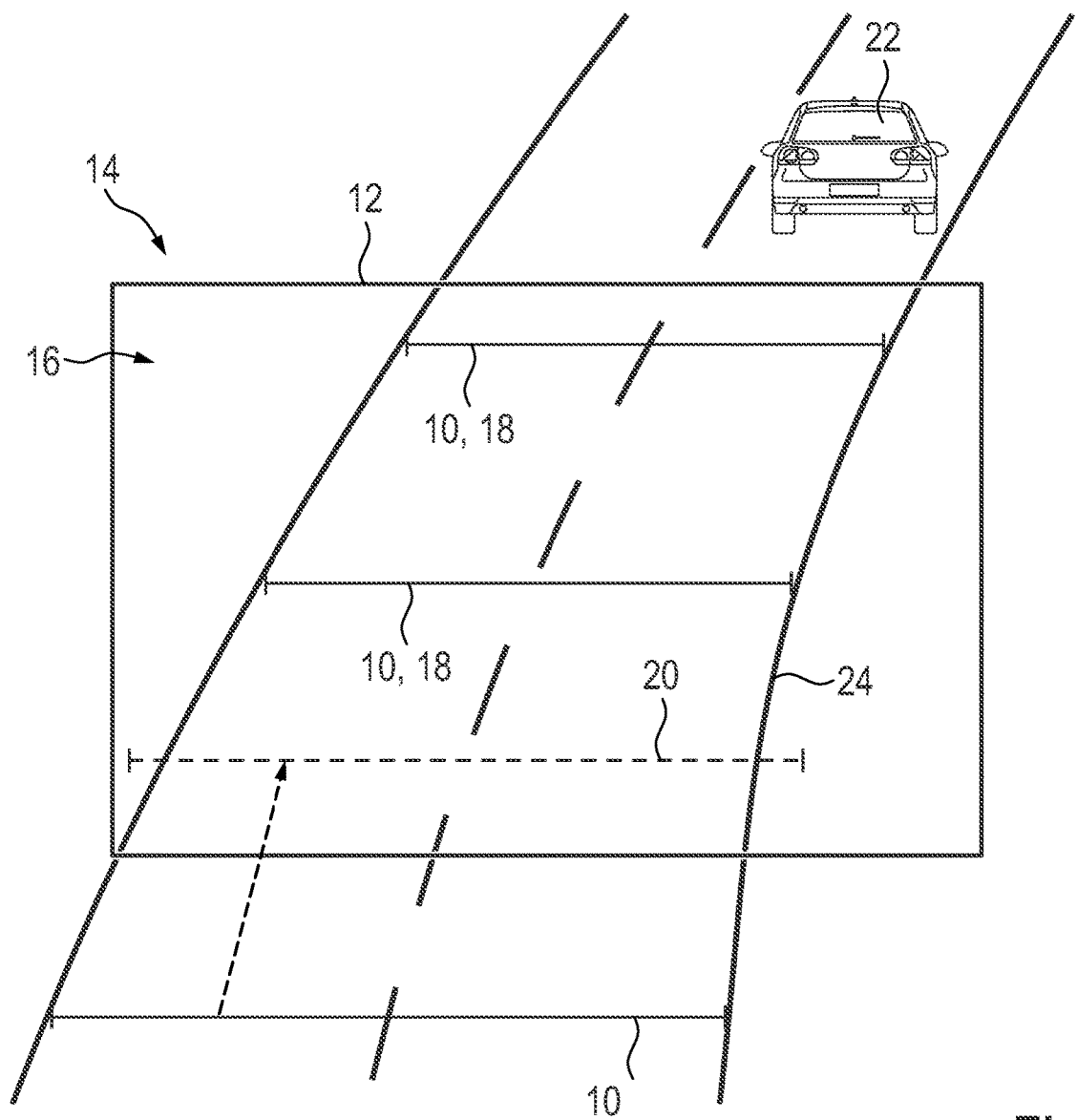
FIG. 1 shows a schematic depiction of a display area of a display apparatus when carrying out an exemplary embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a driver of the vehicle is signaled when the determined three-dimensional coordinates of the at least one virtual element lie outside of the display area of the display apparatus. In this manner, the driver of the vehicle is informed that objects which are relevant to him lie outside of his field of vision. The signaling may be visual, but it may also for example be acoustic.

The display area of the display apparatus may be a display in the middle area or in the cockpit area, for example in the instrument cluster of the vehicle. Alternatively or in addition, the display area of the display apparatus may be designed as a head-up display. A head-up display is to be understood as a display area in which the driver may maintain his head angle, or respectively viewing direction because the information is projected into his field of vision, for example on the windshield of the vehicle.

The depicted three-dimensional space may for example describe an area outside of the vehicle in the driving direction. In a head-up display, the display area of the display apparatus, or respectively the three-dimensional space, is equivalent to looking through the windshield. The three-dimensional space is then consequently the space in front of the vehicle in the field of vision of the driver, or respectively the passenger. The corresponding two-dimensional coordinates calculated for the virtual element may for example be Cartesian coordinates.

The data sources needed to calculate the coordinates may differ. For example, these data sources are vehicle data, or respectively navigation data that are recorded by the position sensors of the vehicle such as for example GPS, rotation rate sensors, or cameras.

In calculating the three-dimensional coordinates of the virtual element, it is established whether the element may be depicted in correct perspective in the field of vision of the driver. If this is not the case because the three-dimensional coordinates lie outside of the field of vision, the driver is instead notified that such a virtual element does not lie within the display area of the display apparatus, or respectively within his field of vision.

The virtual element may be various picture elements and/or buttons that are depicted in the display area of the display apparatus. The virtual elements may have a link to vehicle data and/or be dependent on the driving properties of the vehicle. The data may for example originate from existing driver assist systems. It is however also concealable for the depicted virtual elements to be irrelevant to the driving properties of the vehicle.

Other exemplary embodiments result from the remaining features specified in the dependent claims.

In some embodiments, the three-dimensional coordinates of the virtual element are determined based on a measurement of distance to the preceding vehicle. In this manner, data from so-called adaptive cruise control (ACC) may be used. With this function, users may choose between, for example, five levels which each result in a different distance to the preceding vehicle.

It would be conceivable in this case to project markings as contact-analog virtual elements into the field of vision of the driver that simplify the estimation of the spatial distance. If such markings are no longer in the field of vision of the driver because the distance is for example too great to depict such a marking in correct perspective in the display area of the display apparatus, the driver is notified thereof.

Alternatively or in addition in other embodiments, the three-dimensional coordinates of the virtual element may be determined based on the time interval to the preceding vehicle. Given this time gap adjustment, the driver of the vehicle may choose between, for example, five levels which each result in a different distance to the preceding vehicle. According to the "time gap" designation, each level is defined by a specific time interval to the preceding vehicle such as for example 1 s. From the actual speed as well as the time gap, the distance to be maintained is calculated which may be depicted as a contact-analog line in the display area of the display apparatus. Other depictions are also conceivable.

Corresponding to the definition, the line shifts in perspective to the rear, or respectively forward (in the 2D field division, up, or respectively down) so that it may migrate out of the field of vision. In an ideal case, all selectable levels in the field of vision are visible. Depending on the speed, individual lines may however migrate out of the field of vision, as a result of which a depiction of the currently active time gap no longer exists. Consequently, the driver is notified that one of these lines, or respectively markings lies outside of the display area.

In some embodiments, it is depicted in an edge area of the display area of the display apparatus that the three-dimensional coordinates of the at least one virtual element lie outside of the display area of the display apparatus. In this manner, the driver is signaled that a virtual element cannot be depicted in the display area since it is located in terms of perspective outside of this area. The driver is however not unnecessarily distracted if a signal is only in the edge area. Accordingly, other depicted virtual elements are also not overlapped, and the overall display area of the display apparatus does not become confusing to the driver.

In order to design the method more intuitively, in some embodiments, the top edge area of the display area of the display apparatus depicts that the three-dimensional coordinates of the at least one virtual element lie outside of the display area of the display apparatus when the three-dimensional coordinates of the at least one virtual element lie, in terms of perspective, so far in the background that the two-dimensional image of the virtual element lies above the display area of the display apparatus.

Elements in the display area of the display apparatus that lie, in terms of perspective, to the rear at a greater distance migrate upward in the 2D field of vision. The signaling in the top edge area suggests to the driver that an element has migrated so far to the background, or respectively to the rear, that it may no longer be depicted in the display area of the display apparatus.

Correspondingly in some embodiments, the bottom edge area of the display area of the display apparatus depicts that the three-dimensional coordinates of the at least one virtual element lie outside of the display area of the display apparatus when the three-dimensional coordinates of the at least one virtual element lie, in terms of perspective, so far in the foreground that the two-dimensional image of the virtual element lies below the display area of the display apparatus.

The signaling in the bottom edge area therefore suggests to the driver that an element has migrated so far to foreground, or respectively to the front, that it may no longer be depicted in the display area of the display apparatus.

In some embodiments, the signaling is realized by the depiction of a virtual signaling element in the display area of the display apparatus. A virtual signaling element that appears in the field of vision of the driver may easily signal that the actual virtual element is not located in the display area of the display apparatus. The virtual signaling element may have many different embodiments. It is important that the virtual signaling element is suitable for notifying the driver that another relevant virtual element is not depicted in the display area of the display apparatus.

It would for example be conceivable for the virtual signaling element to have a graphically simple design so as to not unnecessarily influence the driver's attention. It may for example be a dot or a line. For example, the depiction of text in the form of, for example, the name of the corresponding object that is not depicted is however also conceivable.

In some embodiments, the virtual signaling element has the width of the undepicted virtual element in the correct mode of depiction, in terms of perspective, for the virtual element. In this manner, the driver of the vehicle may for example estimate the distance to the undepicted virtual element. Given the correct width in terms of perspective, the driver may therefore recognize how much narrower the virtual signaling element is in comparison to the closest depicted virtual element if, for example, they are the aforementioned distant lines. Since this is the correctly depicted width in terms of perspective of the actual coordinates of the virtual element, the driver may conceptually expand his perspective, and may conceptually place the virtual signaling element correctly in perspective.

Correspondingly and in some embodiments, the virtual signaling element corresponds to the undepicted virtual element, and the virtual signaling element has the size of the virtual element in the correct mode of depiction in terms of perspective. Given the correct size of the virtual signaling element in terms of perspective relative to the actual three-dimensional coordinates that are not in the display area of the display apparatus, the driver may more easily conceptually expand his perspective and conceptually place the virtual signaling element correctly in perspective. Accordingly, the driver may conceptually expand his field of vision.

Alternatively or in addition, the virtual signaling element may be depicted as an icon. An icon may have any desired size and either be correspondingly depicted in the edge area of the display area of the display apparatus, or if the icon is comparatively small, it may also be arranged in the direct field division of the driver.

The various embodiments mentioned in this application may beneficially be combined with one another, unless designed otherwise in individual cases.

The invention will be explained in further exemplary embodiments below based on the associated drawings. Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows the depiction of virtual elements 10 in the display area 12 of a display apparatus 14. A three-dimensional space 16 is depicted in the display area 12. The virtual elements 10 are depicted by a two-dimensional image 18, if possible in correct perspective, in the display area 12. To accomplish this, three-dimensional coordinates for locating at least one of the virtual elements 10 are determined based on at least one data source. The three-dimensional coordinates should indicate precisely where the two-dimensional image 18 must be located to give a very realistic impression that the two-dimensional image 18 is perceived in a contact-analog manner, i.e., as part of the environment.

In determining the three-dimensional coordinates, it may happen that, based on the data source, a virtual element 10 to be depicted should lie outside of the display area 12 of the display apparatus 14. In this regard, it is provided that the driver of the vehicle may be signaled when a virtual element 10 that is relevant to him is unable to be depicted in the display area 12. The virtual elements 10 may for example be connected functions of the driver assistance system.

In this exemplary embodiment, the driver is informed by a virtual signaling element 20 that a virtual element 10 associated with the selected function cannot be displayed in the display area 12 of the display apparatus 14. In the present exemplary embodiment, the three-dimensional coordinates of the virtual element 10 are determined based on a measurement of distance to the preceding vehicle 22. In this manner, data from so-called adaptive cruise control (ACC) may be used. With this function, users may choose between, for example, several display levels which each result in a different distance to the preceding vehicle 22.

In the present case, the time interval, or respectively the time gap adjustment, to the preceding vehicle 22 is determined. According to the "time gap" designation, each level is defined by a specific time interval from the preceding vehicle 22 such as for example 1 s. From the actual speed as well as the time gap, the distance to be maintained is calculated which may be depicted as a contact-analog line as a virtual element 10 in the display area 12 of the display apparatus 14. Other depictions are also conceivable.

In FIG. 1, it is apparent that the time intervals are seemingly projected as lines for the driver on the roadway 24. In this exemplary embodiment, the driver is shown three selected lines that depend on the time interval to the preceding vehicle 22. It is apparent that the line closest to the driver in terms of perspective in the form of the bottommost virtual element 10 is not arranged in the display area 12 of the display apparatus 14. In the depicted method, it is recognized that the three-dimensional coordinates for this virtual element 10 do not lie in the display area 12 of the display apparatus 14.

This is communicated to the driver by means of the virtual signaling element 20. The virtual signaling element 20 is depicted at the bottom edge of the display area 12 of the display apparatus 14 and corresponds to the virtual element 10 whose three-dimensional coordinates lie outside of the display area 12. This means that the virtual signaling element 20 is not displayed correctly in perspective in the display area 12, but rather in the size and state that would actually be provided for the correct location of the virtual signaling element 20. In this manner, the driver of the vehicle may conceptually infer that the virtual element 10 to actually be depicted, in this case a line that should be displayed at a certain time interval to the preceding vehicle 22, lies significantly closer than it could be depicted by the display apparatus 14.

The depiction of the virtual signaling element 20 in the bottom edge area of the display area 12 of the display apparatus 14 suggests to the driver that an element has migrated so far to foreground, or respectively to the front, that it may no longer be depicted in the display area 12 of the display apparatus 14.

Figure 2:
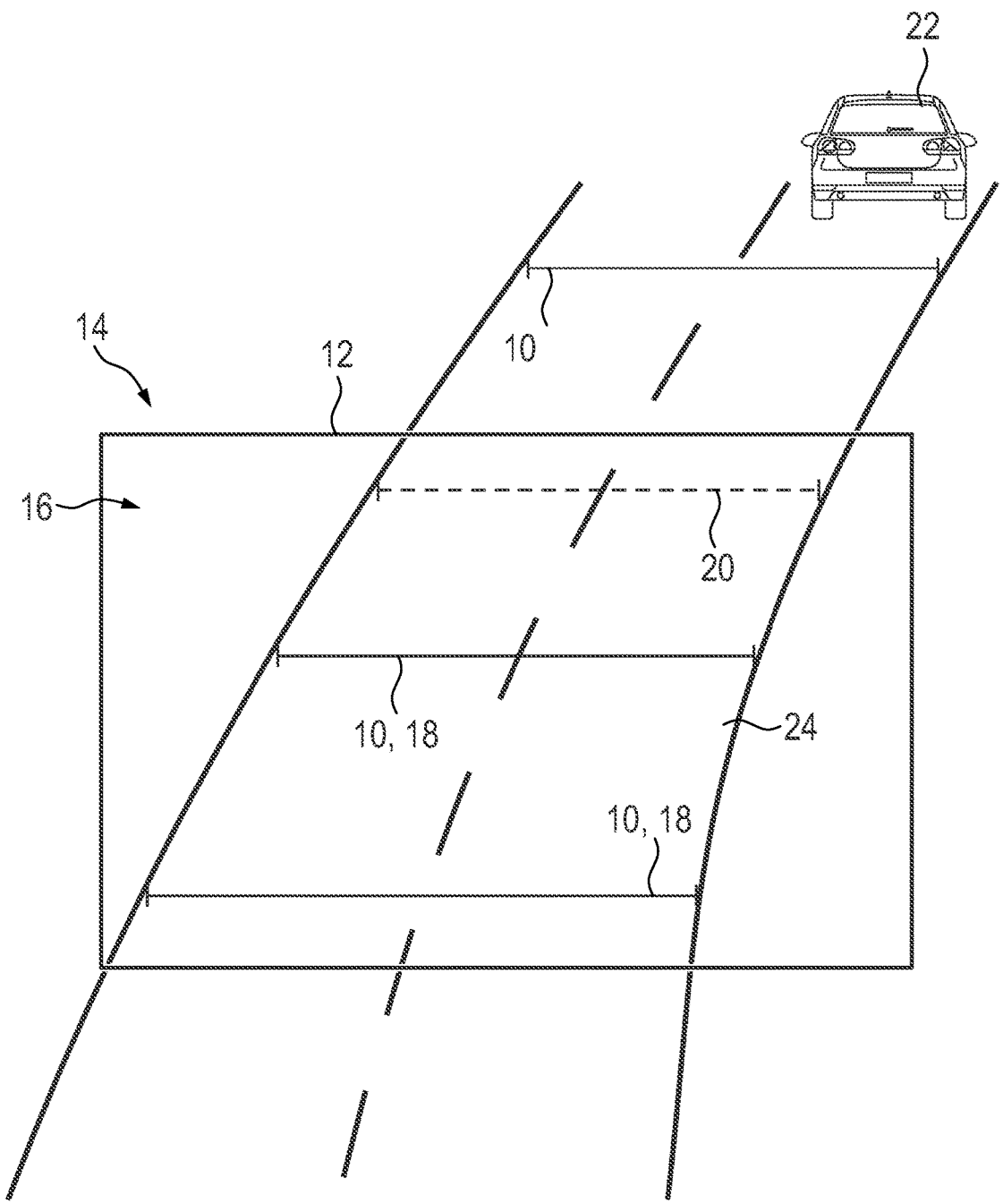
FIG. 2 shows an additional depiction of a display area of a display apparatus when carrying out another exemplary embodiment.

Analogous to FIG. 1, FIG. 2 shows for example that the time intervals are seemingly projected as lines for the driver on the roadway 24. In this exemplary embodiment, the driver is shown three selected lines that depend on the time interval to the preceding vehicle 22. It is apparent that the line furthest from the driver in terms of perspective in the form of the uppermost virtual element 10 is not arranged in the display area 12 of the display apparatus 14. In the depicted method, it is recognized that the three-dimensional coordinates for this virtual element 10 do not lie in the display area 12 of the display apparatus 14.

This is communicated to the driver by means of the virtual signaling element 20. The virtual signaling element 20 is depicted at the upper edge of the display area 12 of the display apparatus 14 and corresponds to the virtual element 10 whose three-dimensional coordinates lie outside of the display area 12. This means that the virtual signaling element 20 is not displayed correctly in perspective in the display area 12, but rather in the size and state that would actually be provided for the correct location of the virtual signaling element 20. It is therefore depicted smaller than it would be depicted if correctly located at this position. In this manner, the driver of the vehicle may conceptually infer that the virtual element 10 to actually be depicted, in this case also a line that should be displayed at a certain time interval from the preceding vehicle 22, lies significantly further than it could be depicted by the display apparatus 14.

Figure 3:
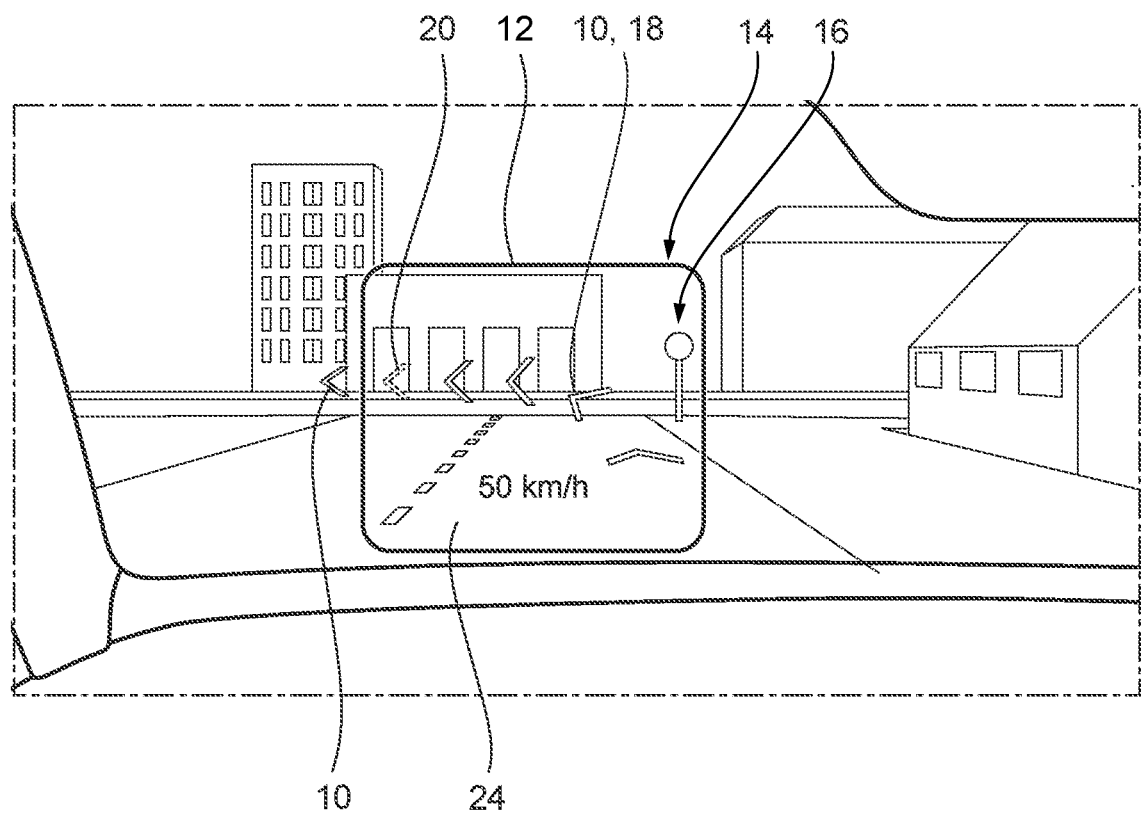
FIG. 3 shows a schematic depiction of a vehicle with a device according to an embodiment.

FIG. 3 shows for example another embodiment of the method, or respectively a vehicle with a corresponding device for carrying out the method. In this display area 12 of the display apparatus 14, the virtual elements 10 are depicted in the form of navigation instructions. The navigation instructions that in this case depict a curve cannot be depicted entirely correctly in perspective in the display area 12 of the display apparatus 14. This is also displayed to the driver of the vehicle in the form of the virtual signaling element 20. In the depicted example, it is a left-hand curve to be navigated that is not depicted entirely correctly in perspective by the depicted virtual elements 10.

By the depiction of the virtual signaling element 20 in the left edge area of the display area 12 of the display apparatus 14, the driver of the vehicle is shown that the curve is not yet over if he were to only follow the depicted virtual elements 10. By depicting the virtual signaling element 20 in the size of the virtual element 10 whose three-dimensional coordinates lie outside of the display area 12 of the display apparatus 14, the driver may estimate how long the curve will take beyond the depicted indicators.

LIST OF REFERENCE NUMERALS

10 Virtual element
12 Display area
14 Display apparatus
16 Three-dimensional space
18 Two-dimensional image
20 Virtual signaling element
22 Preceding vehicle
24 Roadway The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for depicting multiple virtual elements in a display area of at least one display apparatus of a vehicle, wherein a three-dimensional space is depicted in the display area of the display apparatus, the method comprising:
   determining, based on at least one data source, three-dimensional coordinates for locating the multiple virtual elements;
   determining, whether the three-dimensional coordinates of each virtual element of the multiple virtual elements in the depicted three-dimensional space lie within the display area of the display apparatus or not;
   for each first virtual element of a set of first virtual elements of the multiple virtual elements having three-dimensional coordinates that lie within the three-dimensional space depicted in the display area of the display apparatus:
      transforming the respective first virtual element as a two-dimensional image in the three-dimensional space that is depicted in the display area of the display apparatus; and
      depicting the respective first virtual element in the display area of the display apparatus in a correct perspective in a field of vision of a driver with respect to the three-dimensional space; and
   for a second virtual element of the multiple virtual elements having three-dimensional coordinates that lie outside the three-dimensional space depicted in the display area of the display apparatus, visually depicting a virtual signaling element in the display area of the display apparatus to indicate the presence of the second virtual element lying outside the three-dimensional space depicted in the display area.

2. The method of claim 1, wherein the three-dimensional coordinates of each virtual element are determined based on a measurement of distance to a preceding vehicle.

3. The method of claim 2, wherein the three-dimensional coordinates of the at least one each virtual element are determined based on a time interval to a preceding vehicle.

4. The method of claim 1, wherein the three-dimensional coordinates of each virtual element are determined based on a time interval to the preceding vehicle.

5. The method of claim 1, wherein the virtual signaling element comprises a visually modified first virtual element of the set of first virtual elements, wherein the visual modification of the visually modified first virtual element indicates the presence of the second virtual element lying outside the three-dimensional space depicted in the display area.

6. The method of claim 5, wherein the visually modified first virtual element comprises a first virtual element having a modified depicted size, wherein the modified depicted size indicates a relative location of the three-dimensional coordinates of the second virtual element.

7. The method of claim 5, wherein the visually modified first virtual element comprises a first virtual element having a dashed appearance to indicate the presence of the second virtual element lying outside the three-dimensional space depicted in the display area.

8. The method of claim 1, wherein the virtual signaling element is depicted as an icon.

* * * * *